United States Patent
Quach

(12) 
(10) Patent No.: US 10,015,462 B1
(45) Date of Patent: Jul. 3, 2018

(54) RISK DEPENDENT VARIABLE COMPRESSION RATE FOR EVENT STORAGE

(71) Applicant: Lytx, Inc., San Diego, CA (US)

(72) Inventor: Quoc Chan Quach, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 15/379,806

(22) Filed: Dec. 15, 2016

(51) Int. Cl.
*H04N 5/917* (2006.01)
*H04N 9/804* (2006.01)
*H04N 9/87* (2006.01)
*G07C 5/08* (2006.01)

(52) U.S. Cl.
CPC ......... *H04N 9/8042* (2013.01); *G07C 5/0866* (2013.01); *H04N 9/8715* (2013.01)

(58) Field of Classification Search
CPC ... H04N 9/8042; H04N 9/8715; G07C 5/0866

USPC .................................................. 386/328
See application file for complete search history.

(56) References Cited

U.S. PATENT DOCUMENTS

2010/0250021 A1* 9/2010 Cook .............. G07C 5/085
701/1
2016/0292881 A1* 10/2016 Bose .............. G06K 9/00342

\* cited by examiner

*Primary Examiner* — Thai Tran
*Assistant Examiner* — Jose Mesa
(74) *Attorney, Agent, or Firm* — Van Pelt, Yi & James LLP

(57) ABSTRACT

A system for event recording includes an interface and a processor. The interface is configured to receive video data and sensor data. The processor is configured to determine a risk level based at least in part on the sensor data; determine a storage quality based at least in part on the risk level; determine a processed video data by processing the video data according to the storage quality; and store the processed video data.

18 Claims, 9 Drawing Sheets

| Risk Level | Cause | Frame Rate | Resolution | Compression Level |
|---|---|---|---|---|
| Level 1 | No triggers; no environmental risk | 5 fps | 640 x 360 | Very Lossy |
| Level 2 | One low score trigger; one low importance trigger; or medium environmental risk | 10 fps | 640 x 360 | Lossy |
| Level 3 | One medium score trigger; one medium importance trigger; elevated environmental risk | 10 fps | 640 x 360 | Medium Integrity |
| Level 4 | One high score trigger; one high importance trigger | 20 fps | 1280 x 720 | Medium Integrity |
| Level 5 | Multiple high score or importance triggers | 20 fps | 1280 x 720 | High Integrity |

Fig. 5

RISK DEPENDENT VARIABLE COMPRESSION RATE FOR EVENT STORAGE

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. A vehicle event recorder system including one or more video recorders records video continually over the course of vehicle usage. The vehicle event recorder system can make a decision whether or not to store the video based on detection of anomalous events—for example, video is only stored for the long term during the time period near an anomalous event. This can save video storage space, however, it creates a problem where video for some periods of time is not accessible later. In the event that it is determined that at a given time something of interest occurred but was not stored for the long term, data from that time cannot be reviewed to determine further information.

BRIEF DESCRIPTION OF THE DRAWINGS

Various embodiments of the invention are disclosed in the following detailed description and the accompanying drawings.

FIG. 5 is a diagram illustrating an embodiment of a video properties table.

DETAILED DESCRIPTION

Figure 1:
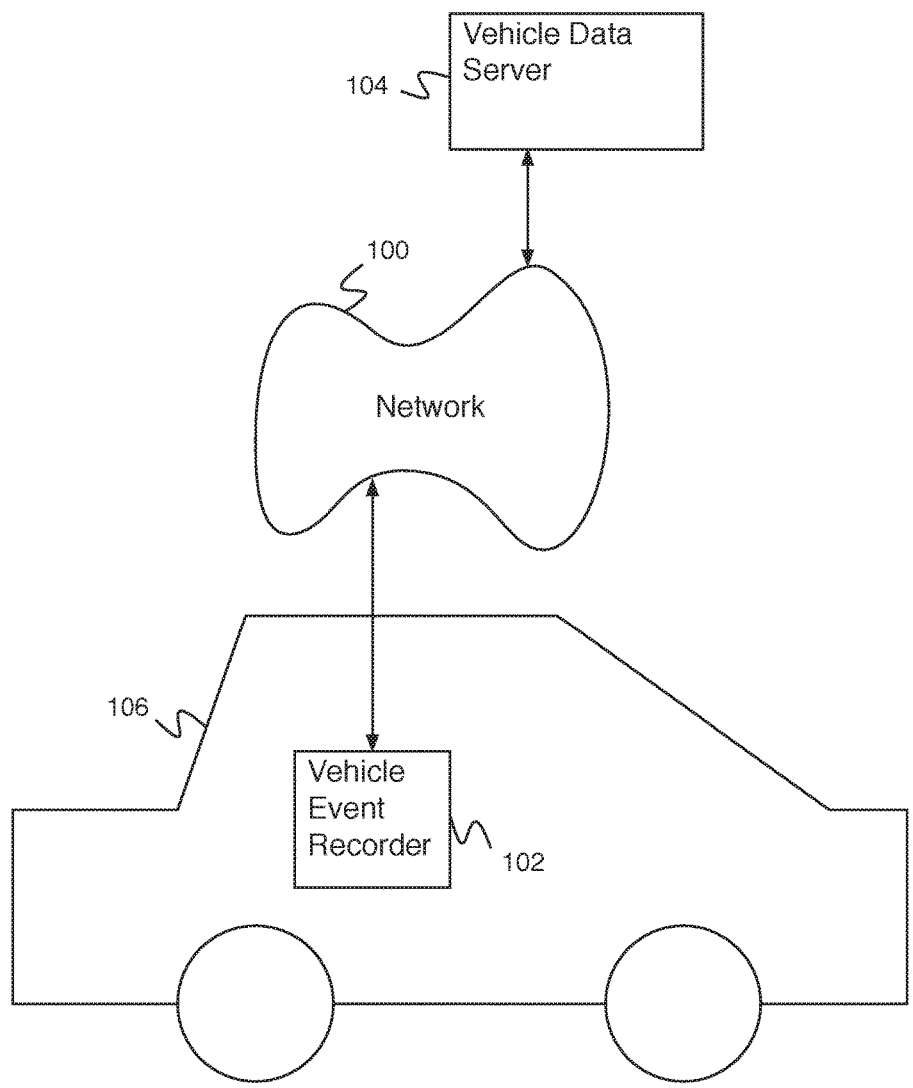
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for event recording is disclosed. The system comprises an interface and a processor. The interface is configured to receive video data and sensor data. The processor is configured to determine a risk level based at least in part on the sensor data, determine a storage quality based at least in part on the risk level, determine a processed video data by processing the video data according to the storage quality, and store the processed video data. In some embodiments, the system for event recording comprises a memory coupled to the processor and configured to provide the processor with instructions.

In some embodiments, a system for event recording records video data from one or more video cameras and/or sensor data from one or more sensors. Video cameras comprise one or more of forward facing video cameras, rearward facing video cameras, side facing video cameras, interior video cameras, driver facing video cameras, etc. Data is additionally collected from one or more sensors. The sensors comprise one or more of accelerometers, global positioning system sensors, vehicle sensors, gyroscopes, the video cameras, etc. In some embodiments, other data is additionally received (e.g., traffic data, weather data, time data, driver profile data, etc.). A risk level is determined from the data. In some embodiments, the risk level comprises a combination of an environmental risk level and an anomalous event based risk level. The risk level changes over time as the environmental risk level changes and anomalous events are detected. After video data and/or sensor data is recorded, it is processed to reduce its storage size and the processed video data and/or sensor data is stored permanently. The processing is performed to reduce the video data and/or sensor data to a storage quality determined based at least in part on the risk level. In some embodiments, in the event the risk level is high, the preserved video data quality and/or sensor data quality is increased (e.g., the situation is determined to be dangerous and therefore the details of the recorded video data and/or sensor data are most likely to be needed at a later time). Conversely, in the event the risk level is low, the preserved video data quality and/or sensor data quality is decreased. In various embodiments, the video frame rate is modified, the video resolution is modified, the video compression is modified, sensor data compression is modified, sensor data sample rate is modified, sensor data is filtered, or any other appropriate video parameter(s) or sensor data parameter(s) are modified. Even in the lowest risk situation video data and/or sensor data is preserved in some form in order to make it accessible at a later point.

FIG. 1 is a block diagram illustrating an embodiment of a system including a vehicle event recorder. In the example shown, vehicle event recorder 102 comprises a vehicle event recorder mounted in a vehicle (e.g., a car or truck). Vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, or any other appropriate vehicle state sensors. Vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. Vehicle event recorder 102 comprises a communications system for communicating with network 100. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. Vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly.

Figure 2:
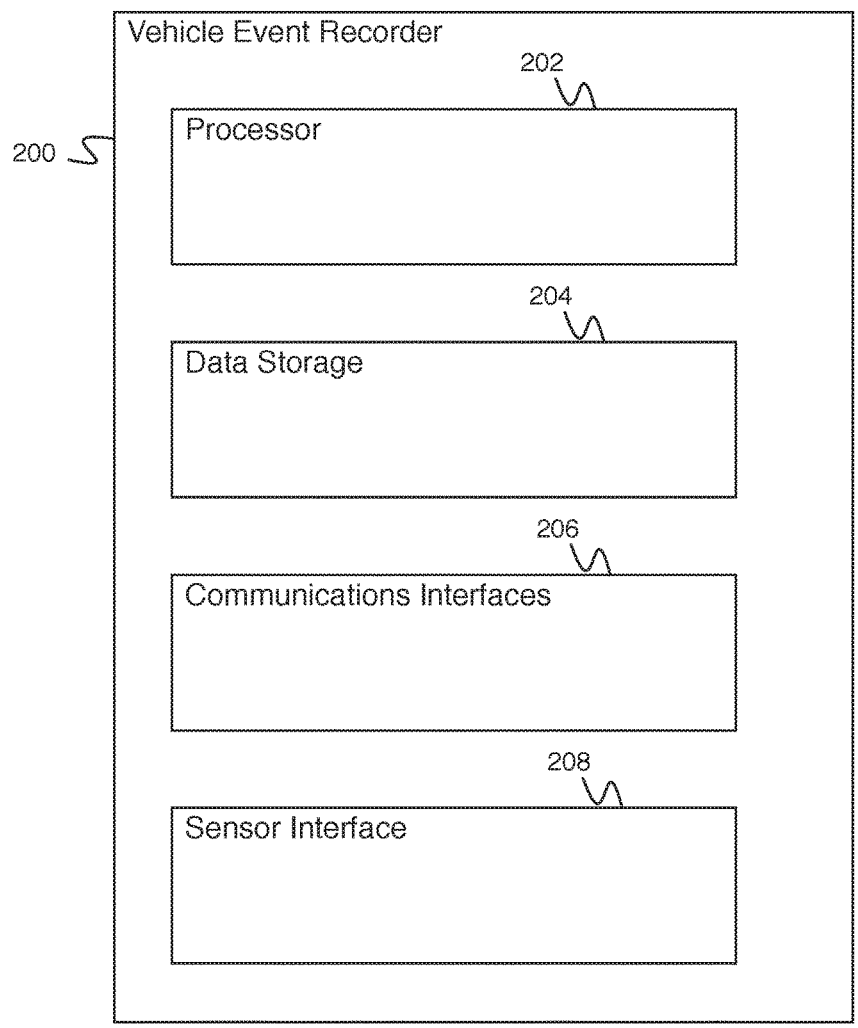
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. In various embodiments, processor 202 comprises a processor for determining anomalous events, determining a storage compression, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus. In some embodiments, vehicle event recorder 200 communicates with a vehicle data server via communications interfaces 206. In various embodiments, vehicle event recorder 200 transmits vehicle state sensor data, accelerometer data, speed data, maneuver data, audio data, video data, event data, or any other appropriate data to the vehicle data server.

In some embodiments, vehicle event recorder 200 comprises a system for determining events from data. In various embodiments, event information and associated data is stored, processed, uploaded immediately, uploaded at a later time, provided to an administrator, or handled in any other appropriate way. Event data is continually stored (e.g., and not deleted after a time-delay period). Event data is processed to be stored more efficiently, for example, at different levels of compression depending on a risk level. In some embodiments, processing is done as processing resource is available—for example, when the vehicle is not driving, when the processor is otherwise underutilized, or any other appropriate time. In some embodiments, in the event an event is determined from continuously stored data, an event flag or event rating or risk level is stored associated with the continuously stored data. In some embodiments, data storage is modified based at least in part on an event flag (e.g., data is stored at higher resolution in the vicinity of an event flag). In some embodiments, event data is extracted from continuously stored data. In some embodiments, event data is uploaded (e.g., immediately, at a later time, etc.). In some embodiments, flag data (e.g., an event type, an event severity, etc.) is uploaded. In some embodiments, flag metadata (e.g., a list of flags, a flag identifier, etc.) is uploaded.

Figure 3:
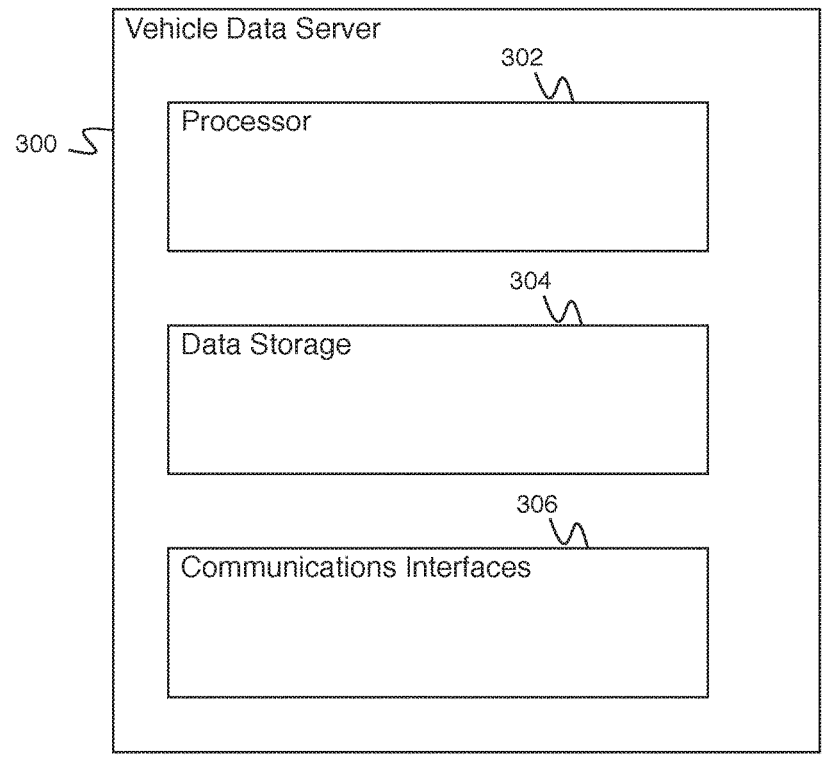
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises processor 302. In various embodiments, processor 302 comprises a processor for determining a route, determining a set of route segments, determining a route segment safety score, collecting speed data, determining a speed distribution, or for any other appropriate purpose. Data storage 304 comprises a data storage (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, machine learning algorithm data, or any other appropriate data. In various embodiments, communications interfaces 306 comprises one or more of a GSM interface, a CDMA interface, a WiFi interface, an Ethernet interface, a USB interface, a Bluetooth interface, an Internet interface, a fiber optic interface, or any other appropriate interface. Vehicle data server 300 receives events, maneuvers, data, or any other appropriate information from one or more vehicle event recorders.

Figure 4:
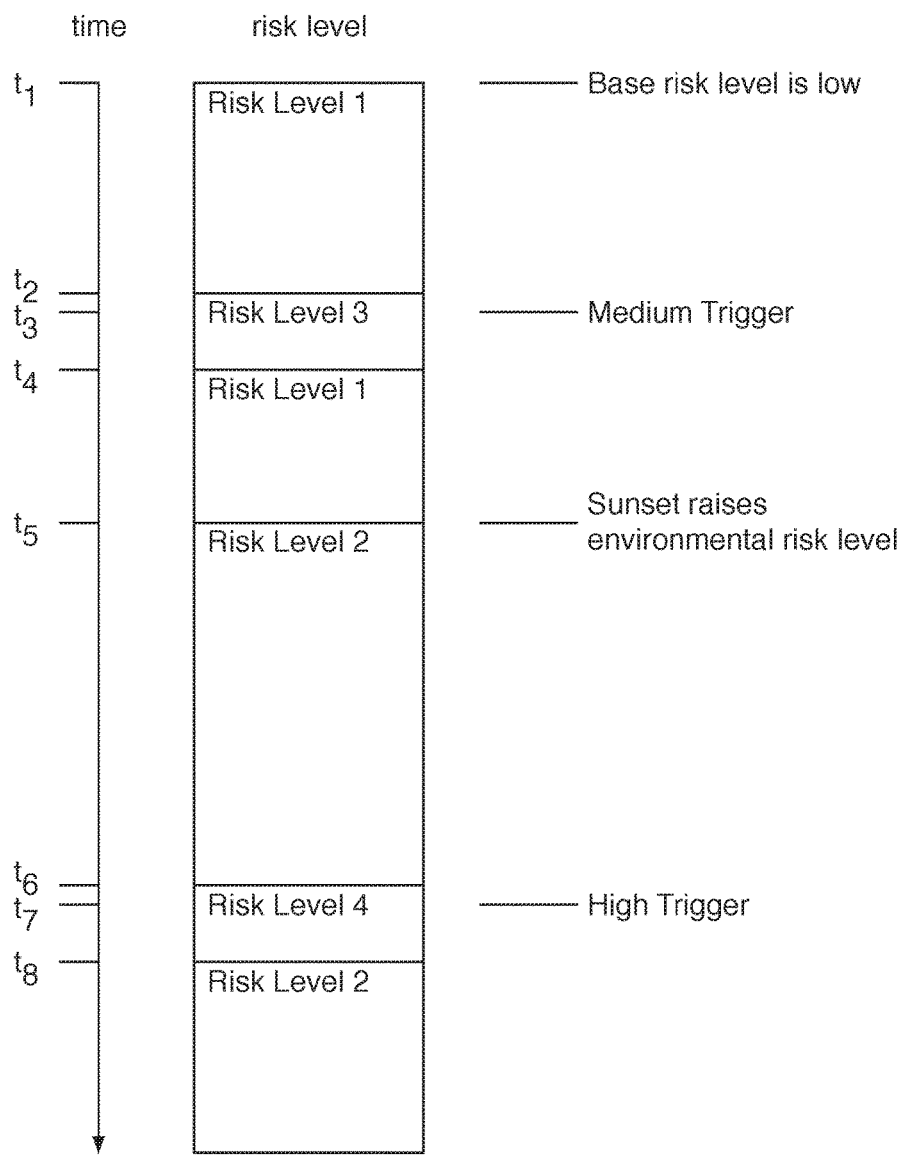
FIG. 4 is a diagram illustrating an embodiment of a timeline of risk level changes.

FIG. 4 is a diagram illustrating an embodiment of a timeline of risk level changes. In some embodiments, the timeline of FIG. 4 comprises a timeline of risk level determined by a vehicle event recorder (e.g., vehicle event recorder 102 of FIG. 1) over a period of time (e.g., a day, a driving shift, etc.). In the example shown, time proceeds downwards on the timeline starting at time $t_1$. At time $t_1$ the risk level is low, for example, there are no triggered events or environmental risk (e.g., traffic, weather, darkness, etc.). At time $t_3$ a medium level triggered event occurs. The vehicle event recorder denotes the time starting at time $t_2$, for example, briefly preceding time $t_3$, as risk level 3. In some embodiments, time $t_2$ is identified as the starting time of the increased risk level after the trigger occurs (e.g., after time $t_3$). In various embodiments, the risk level of a previous time is modified using a time-delay buffer, continuous storage of video data, non-real time processing (e.g., processing after the fact, at the end of the day, etc.), or using any other appropriate technique. At time $t_4$, the elevation of the risk level caused by the trigger at time $t_3$ returns to normal, and the risk level returns to risk level 1. At time $t_5$, the sun sets, putting the vehicle in darkness and raising the risk level to risk level 2. At time $t_7$, a high level trigger event occurs, causing the risk level to be raised to risk level 4 from time $t_6$ until time $t_5$. After time $t_5$, the risk level is returned to risk level 2 until the end of the time period.

FIG. 5 is a diagram illustrating an embodiment of a video properties table. In some embodiments, the table of FIG. 5 comprises a table indicating video properties used by a vehicle event recorder (e.g., vehicle event recorder 102 of FIG. 1) during periods of time designated to be different risk levels. In the example shown, the vehicle event recorder records video at a full storage size and reduces the video storage size as indicated according to the risk level. The video properties table of FIG. 5 shows a cause associated with each of five risk levels and the resulting video frame rate, resolution, and compression setting for video processing. In various embodiments, a processed video frame rate comprises 5 frames/second, 10 frames/second, 20 frames/second, 24 frames/second, 30 frames/second, 60 frames/second, or any other appropriate frame rate. In various embodiments, a processed video resolution comprises a standard video resolution, an NSTC video resolution, a PAL video resolution, 640 pixels by 480 pixels, 640 pixels by 360 pixels, or 1280 pixels by 720 pixels, or any other appropriate resolution. In various embodiments, a compression rate comprises high integrity video compression, medium integrity video compression, lossy compression, very lossy compression, or any other appropriate compression rate. In some embodiments, the video compression comprises H.264 video compression. In various embodiments, the data rate after compression comprises 250 kbps for level 1, 325 kbps for level 2, 400 kbps for level 3, 1.5 Mbps for level 4, and 2.0 Mbps for level 5. In various embodiments, the data rate for compression comprises a video data rate, a video and sensor data rate, a sensor data rate, or any other appropriate data rate. In some embodiments, a compression rate indicates a compression algorithm or compression settings. In the example shown, risk level 1 (e.g., corresponding to no triggers and no environmental risk) comprises a 5 frames/second frame rate, 640×360 resolution, and very lossy compression. Risk level 2 (e.g., corresponding to one low score trigger, or one low importance trigger, or medium environmental risk) comprises a 10 frames/second frame rate, 640×360 resolution, and lossy compression. Risk level 3 (e.g., corresponding to one medium score trigger, or one medium importance trigger, or elevated environmental risk) comprises a 10 frames/second frame rate, 640×360 resolution, and medium integrity compression. Risk level 4 (e.g., corresponding to one high score trigger or one high importance trigger) comprises a 20 frames/second frame rate, 1280×720 resolution, and medium integrity compression. Risk level 5 (e.g., corresponding to multiple high score or high importance triggers) comprises a 20 frames/second frame rate, 1280×720 resolution, and high integrity compression.

Figure 6:
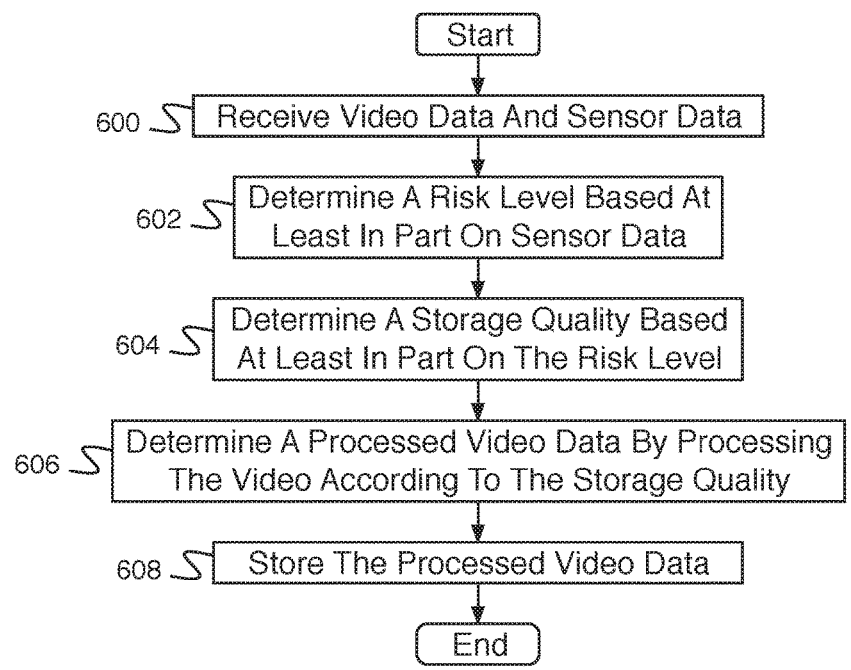
FIG. 6 is a flow diagram illustrating an embodiment of a process for a system for event recording.

FIG. 6 is a flow diagram illustrating an embodiment of a process for a system for event recording. In some embodiments, the process of FIG. 6 is executed by vehicle event recorder 102 of FIG. 1. In the example shown, in 600, video data and sensor data is received. For example, video data and sensor data are received from sensors and cameras associated with the vehicle event recorder and/or the vehicle. In some embodiments, other data is received (e.g., traffic level data, weather data, a time, driver profile data, an available storage, etc.). In 602, a risk level is determined based at least in part on sensor data. In some embodiments, the risk level is determined based at least in part on the other data (e.g., on the time, on the traffic level data, on the weather data, on the driver profile data, etc.). In some embodiments, the risk level is determined on the fly (e.g., in real time as data is received). In some embodiments, the risk level is determined at a later time (e.g., at the end of a trip, overnight, at a time of low processor activity, etc.). In 604, a storage quality is determined based at least in part on the risk level. In some embodiments, the storage quality is based at least in part on the available storage. In 606, a processed video is determined by processing the video according to the storage quality. In some embodiments, the video is processed on the fly. In some embodiments, the video is processed at a later time (e.g., at the end of a trip, overnight, at a time of low processor activity, etc.). In some embodiments, it is determined whether it is an appropriate time to process video, and in the event that it is appropriate, the video is processed. In 608, the processed video is stored. In some embodiments, the original video is deleted. In some embodiments, after storage in 608, event data (e.g., video data and/or sensor data) are compressed further after a period of time. For example, an event may have been saved according to the settings in risk level 4. One month later, it is further compressed, for example, down to the settings associated with risk level 2.

Figure 7:
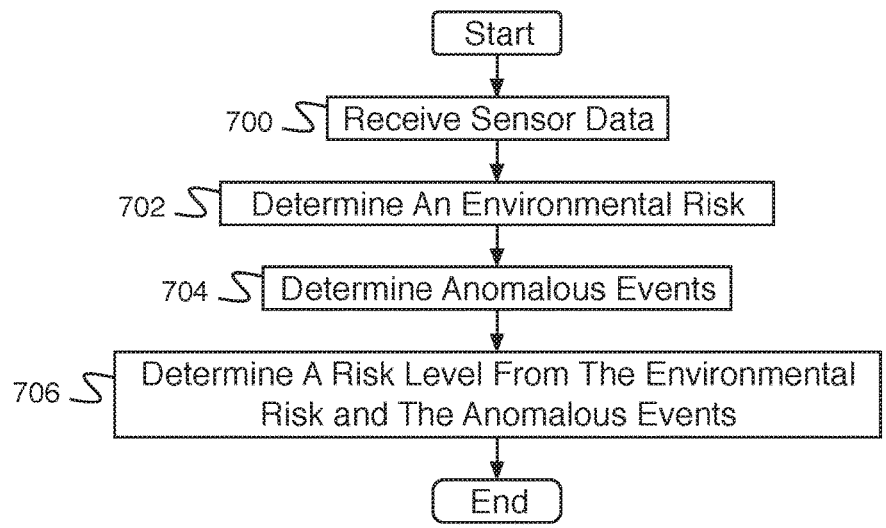
FIG. 7 is a flow diagram illustrating an embodiment of a process for determining a risk level based at least in part on sensor data.

FIG. 7 is a flow diagram illustrating an embodiment of a process for determining a risk level based at least in part on sensor data. In some embodiments, the process of FIG. 7 implements 602 of FIG. 6. In the example shown, in 700, sensor data is received. In various embodiments, sensor data comprises video recorder data, audio recorder data, accelerometer data, gyroscope data, vehicle state sensor data, proximity sensor data, global positioning system data, outdoor temperature sensor data, moisture sensor data, laser line tracker sensor data, speedometer data, accelerator pedal sensor data, brake pedal sensor data, engine revolutions per minute sensor data, engine temperature sensor data, headlight sensor data, airbag deployment sensor data, driver and passenger seat weight sensor data, anti-locking brake sensor data, traction control system sensor data, drive wheel speed sensor data, shocks sensor data, engine exhaust sensor data, gear position sensor data, cabin equipment operation sensor data, or any other appropriate sensor data. In 702, an environmental risk is determined. Environmental risk comprises elevated risk associated with an environmental state (e.g., weather, traffic conditions, time of day, etc.). In 704, anomalous events are determined. In various embodiments, an anomalous event comprises an event type, an event type importance, an event score, an event time, an event location, an event data stream, or any other appropriate event information. In some embodiments, anomalous events are determined by processing sensor data and/or video data and/or analysis thereof. For example, risk level is determined based at least in part on a machine vision analysis of video data (e.g., vehicle following too close as determined using machine vision processing of forward facing video capture, vehicle moves outside of lane boundaries, etc.). In 706, a risk level is determined from the environmental risk and the anomalous events (e.g., using guidelines as shown in the table of FIG. 5).

Figure 8:
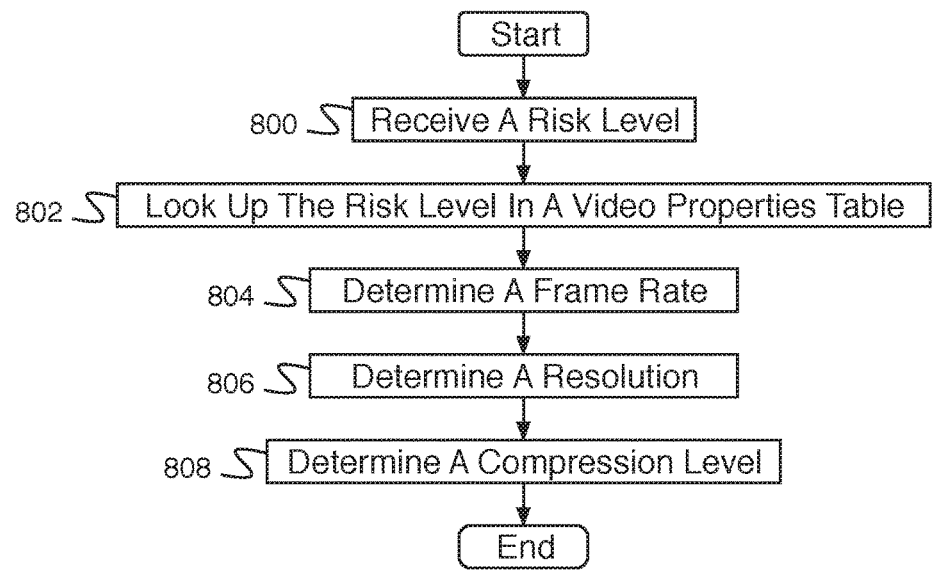
FIG. 8 is a flow diagram illustrating an embodiment of a process for determining a storage quality based at least in part on the risk level.

FIG. 8 is a flow diagram illustrating an embodiment of a process for determining a storage quality based at least in part on the risk level. In some embodiments, the process of FIG. 8 implements 604 of FIG. 6. In the example shown, in 800 a risk level is received. In some embodiments, an available storage is additionally received. In 802, the risk level is looked up in a video and/or sensor properties table. For example, the risk level is looked up in the video properties table such as a table as in FIG. 5. In some embodiments, the risk level is modified based on the available storage (e.g., in the event the available storage is below a threshold, the risk level is reduced). In the example shown, in 804, a frame rate is determined (e.g., from the video properties table). In 806, a resolution is determined. In 808, a compression level is determined. For example, a video compression rate and/or a sensor data compression rate.

Figure 9:
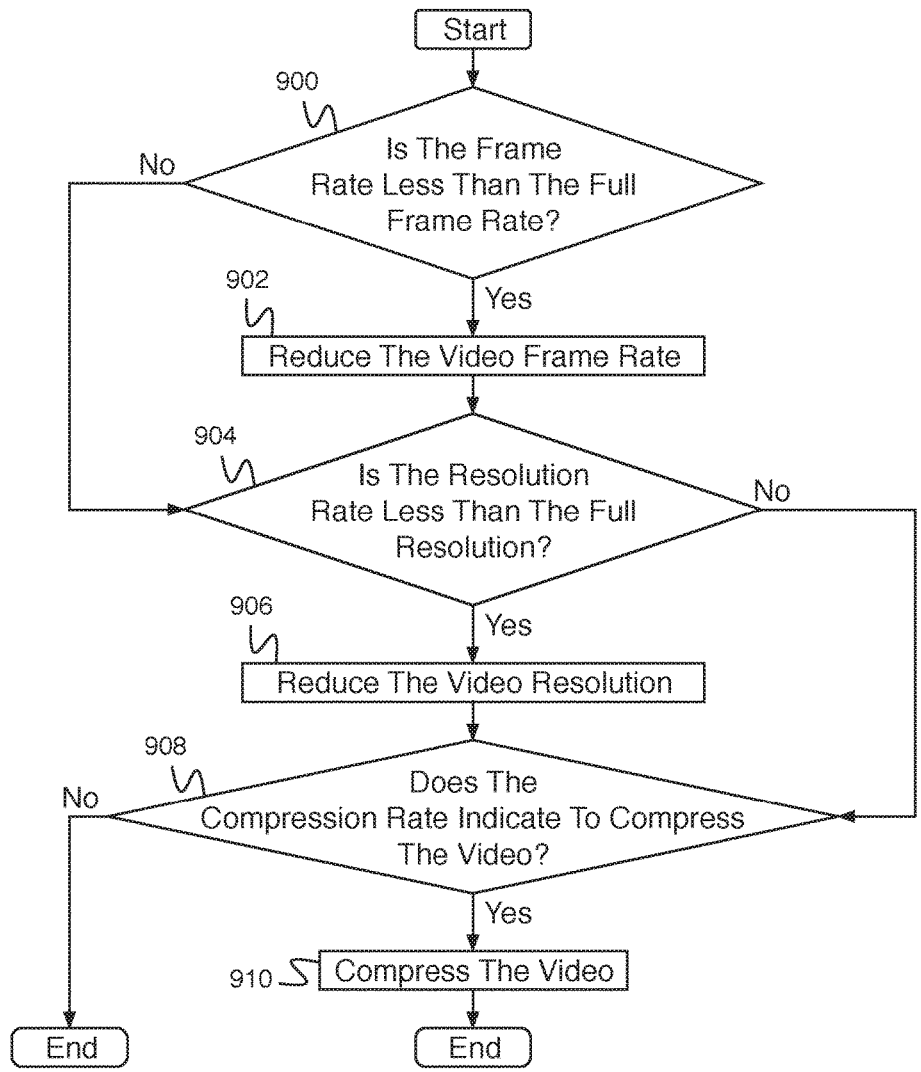
FIG. 9 is a flow diagram illustrating an embodiment of a process for determining a processed video by processing a video according to a storage quality.

FIG. 9 is a flow diagram illustrating an embodiment of a process for determining a processed video by processing a video according to a storage quality. In some embodiments, the process of FIG. 9 implements 606 of FIG. 6. In the example shown, in 900, it is determined whether the frame rate (e.g., the frame rate determined in the process of FIG. 8) is less than the full frame rate. In the event it is determined that the frame rate is not less than the full frame rate, control passes to 904. In the event it is determined that the frame rate is less than the full frame rate, control passes to 902. In 902, the video frame rate is reduced (e.g., by dropping frames, by dropping frames and interpolating frames, etc.). In 904, it is determined whether the resolution (e.g., the resolution determined in the process of FIG. 8) is less than the full resolution. In the event it is determined that the resolution is not less than the full resolution, control passes to 908. In the event it is determined that the resolution is less than the full resolution, control passes to 906. In 906, the video resolution is reduced (e.g., by dropping pixels, by dropping pixels and interpolating pixels, etc.). In 908, it is determined whether the compression rate (e.g., the compression rate determined in the process of FIG. 8) indicates to compress the video. In the event it is determined that the compression rate indicates to compress the video, control passes to 910. In 910 the video is compressed (e.g., according to an algorithm determined from a video properties table), and the process ends. In the event it is determined in 908 that the compression rate does not indicate to compress the video, the process ends.

In some embodiments, the reduction of video storage is done in a single processing step.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for event recording, comprising:
    an interface configured to receive video data and sensor data; and
    a processor configured to:
        determine a risk level based at least in part on the sensor data;
        determine a storage quality based at least in part on the risk level, wherein the storage quality includes one or more video properties;
        process the video data according to the storage quality, wherein to process the video data according to the storage quality includes a step of adjusting at least one of the one or more video properties of the video data based on the determined storage quality; and
        store the processed video data.

2. The system of claim 1, wherein the interface is further configured to receive a time.

3. The system of claim 2, wherein the risk level is based at least in part on the time.

4. The system of claim 1, wherein the interface is further configured to receive an amount of available storage.

5. The system of claim 4, wherein the storage quality is based at least in part on the amount of available storage.

6. The system of claim 1, wherein the interface is further configured to receive a traffic level.

7. The system of claim 1, wherein the processor is further configured to determine one or more anomalous events based at least in part on the sensor data.

8. The system of claim 7, wherein the risk level is based at least in part on the one or more anomalous events.

9. The system of claim 1, wherein the risk level is one of a plurality of risk levels.

10. The system of claim 1, wherein the risk level is determined during a time of low processor activity.

11. The system of claim 1, wherein the one or more video properties includes a frame rate.

12. The system of claim 1, wherein the one or more video properties includes a resolution.

13. The system of claim 1, wherein the one or more video properties includes a compression rate.

14. The system of claim 1, wherein the one or more video properties includes a data rate for compression.

15. The system of claim 1, wherein the processor is further configured to process the sensor data according to the storage quality.

16. The system of claim 15, wherein the processor is further configured to store the processed sensor data.

17. A method for event recording, comprising:
receiving video data and sensor data;
determining, using a processor, a risk level based at least in part on the sensor data;
determining a storage quality based at least in part on the risk level, wherein the storage quality includes one or more video properties;
processing the video data according to the storage quality, wherein processing the video data according to the storage quality includes adjusting at least one of the one or more video properties of the video data based on the determined storage quality; and
storing the processed video data.

18. A computer program product for event recording, the computer program product being embodied in a non-transitory computer readable storage medium and comprising computer instructions for:
receiving video data and sensor data;
determining a risk level based at least in part on the sensor data;
determining a storage quality based at least in part on the risk level, wherein the storage quality includes one or more video properties;
processing the video data according to the storage quality, wherein processing the video data according to the storage quality includes adjusting at least one of the one or more video properties of the video data based on the determined storage quality; and
storing the processed video data.

* * * * *

UNITED STATES PATENT AND TRADEMARK OFFICE
CERTIFICATE OF CORRECTION

| | | |
|---|---|---|
| PATENT NO. | : 10,015,462 B1 | Page 1 of 1 |
| APPLICATION NO. | : 15/379806 | |
| DATED | : July 3, 2018 | |
| INVENTOR(S) | : Quoc Chan Quach | |

It is certified that error appears in the above-identified patent and that said Letters Patent is hereby corrected as shown below:

In the Specification

In Column 06, Line 09, after "until", delete "time $t_5$" and insert --time $t_8$--, therefor.

In Column 06, Line 09, before "the risk level", delete "time $t_5$," and insert --time $t_8$,--, therefor.

Signed and Sealed this
Twenty-fifth Day of December, 2018

Andrei Iancu
*Director of the United States Patent and Trademark Office*